United States Patent [19]
Ekart et al.

[11] Patent Number: 5,945,460
[45] Date of Patent: *Aug. 31, 1999

[54] PROCESS FOR CONTINUOUSLY PRODUCING POLYESTER ARTICLES WITH SCRAP RECYCLE IN A CONTINUOUS MELT-TO-PREFORM PROCESS

[75] Inventors: Michael Paul Ekart; Max Lamar Carroll, Jr.; Eric Gray Olsen; Lanney Calvin Treece, all of Kingsport, Tenn.

[73] Assignee: Eastman Chemical Company, Kingsport, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,542

[22] Filed: Oct. 24, 1997

Related U.S. Application Data

[60] Provisional application No. 60/041,056, Mar. 20, 1997.

[51] Int. Cl.$^6$ .............................. C08J 11/04; C08L 67/02
[52] U.S. Cl. ............................ 521/48; 521/48.5; 528/272
[58] Field of Search ..................... 521/48, 48.5; 528/272

[56] References Cited

U.S. PATENT DOCUMENTS

| | | | |
|---|---|---|---|
| 3,050,533 | 8/1962 | Munro et al. | 528/308.5 |
| 3,703,488 | 11/1972 | Morton | 521/48.5 |
| 4,093,593 | 6/1978 | Go | 525/296 |
| 4,138,374 | 2/1979 | Currie | 521/48 |
| 4,302,505 | 11/1981 | Heberger et al. | 428/341 |
| 4,330,661 | 5/1982 | Go | 528/173 |
| 4,357,461 | 11/1982 | Go | 528/272 |
| 4,381,376 | 4/1983 | Albee et al. | 525/366 |
| 4,403,090 | 9/1983 | Smith | 528/272 |
| 4,412,040 | 10/1983 | Albee et al. | 525/143 |
| 4,424,337 | 1/1984 | Smith et al. | 528/274 |
| 4,447,595 | 5/1984 | Smith et al. | 528/274 |
| 4,603,172 | 7/1986 | Albee et al. | 525/143 |
| 4,764,323 | 8/1988 | Al Ghatta | 528/308.2 |
| 4,837,115 | 6/1989 | Igarashi et al. | 428/36.92 |
| 4,883,115 | 11/1989 | Johanson et al. | 165/239 |
| 5,049,647 | 9/1991 | Al Ghatta | 528/272 |
| 5,104,965 | 4/1992 | Jenkins et al. | 528/272 |
| 5,223,544 | 6/1993 | Burkett et al. | 521/48.5 |
| 5,250,333 | 10/1993 | McNeely et al. | 528/272 |
| 5,258,233 | 11/1993 | Mills et al. | 428/480 |
| 5,266,413 | 11/1993 | Mills et al. | 525/425 |
| 5,308,892 | 5/1994 | Zickler et al. | 523/218 |
| 5,376,702 | 12/1994 | Stibal et al. | 523/313 |
| 5,458,478 | 10/1995 | Stibal et al. | 523/351 |
| 5,503,790 | 4/1996 | Clements . | |
| 5,559,159 | 9/1996 | Sublett et al. | 521/48.5 |
| 5,564,827 | 10/1996 | Signer | 366/336 |
| 5,597,852 | 1/1997 | Unger et al. . | |

FOREIGN PATENT DOCUMENTS

| | | |
|---|---|---|
| 0 483 665 A1 | 5/1992 | European Pat. Off. . |
| 19505680 | 5/1996 | Germany . |
| 19503053 | 8/1996 | Germany . |
| 62-182065 | 7/1987 | Japan . |

*Primary Examiner*—James J. Seidleck
*Assistant Examiner*—Olga Asinovsky
*Attorney, Agent, or Firm*—Karen A. Harding, Esquire; Harry J. Gwinnell, Esquire

[57] ABSTRACT

A process for producing polyester articles, which generates little or no polyester waste. The process provides esterification or transesterification of one or more dicarboxylic acids or their dialkyl esters, polycondensation to produce a high molecular weight polyester, and molding or shaping of the polyester for produce the desired product. Scrap produced during the molding process is recycled back to the esterification or transesterification or polycondensation portion of the process. Optionally, the scrap may also be recycled to intermediate steps prior to the molding operation.

19 Claims, 1 Drawing Sheet

PROCESS FOR CONTINUOUSLY PRODUCING POLYESTER ARTICLES WITH SCRAP RECYCLE IN A CONTINUOUS MELT-TO-PREFORM PROCESS

RELATED APPLICATION

This application claims priority of provisional application Ser. No. 60/041,056 filed Mar. 20, 1997.

BACKGROUND OF THE INVENTION

1. Field of the Invention

The present invention relates to a process for the production of polyester articles in a continuous melt-to-mold process, including a recycling step. A polyester melt composition is prepared from polyester precursors and directly molded or otherwise formed into useful shaped articles in a single, integrated process without solidifying the melt prior to molding. Recycled scrap polyester from the molding step is added to the polymer melt stream at any of a variety of points in the manufacturing process.

2. Description of the Prior Art

Polyesters are useful in a wide variety of applications, many of which require high molecular weight polyester to achieve acceptable properties. In this regard, it is known in the art that polyesters may be used for the manufacture of molded articles, such as food and beverage containers. The conventional method for preparing high molecular weight polyester articles involves melt-phase production of a precursor polyester to a moderate molecular weight followed by pelletization of the amorphous polymer; crystallization and solid-state polycondensation to increase molecular weight to the desired level; and remelting and molding of the polyester to form the desired article.

Polyester molding processes generate much scrap, which is generally reused to reduce costs. Conventionally, the scrap can be recycled to the molding process, which requires drying and leads to increased polymer degradation by increasing the time that the high molecular weight polyester is molten. Alternately, the scrap can be recycled by being transported and fed to a polyester manufacturing plant that produces pellets, fiber, or film. An integrated process for continuously producing formed articles starting from polyester precursor starting materials, melt, molding and recycling scrap polyester such that little or no polyester waste is generated is heretofore unknown.

The prior art describes a continuous melt phase process for the production of shaped articles such as bottle preforms, but it does not address recycling waste polyester generated in the molding step back to the polyester polymer formation stage. Methods for feeding polyester scrap to melt-phase polyester reactors during resin production are known. However, these are not concerned with integrated processes for producing molded articles. For example, U.S. Pat. No. 3,703,488 describes a process in which scrap is mixed with polyester monomer in an extruder, and then breaking it down to a degree of polymerization of 20 to 30 which can be pumped to a reactor. In U.S. Pat. No. 4,138,374, scrap is fed just prior to the outlet of a final melt polymerization reactor. German patents DE19503053 and DE 19505680 describe continuous melt-to-mold processes, but also fail to address the incorporation of recycled scrap polyester to the polymer formation step.

It has been unexpectedly found that it is now possible to provide a process whereby shaped articles may be prepared in a continuous process starting from polyester precursors, wherein recycled scrap polyester from the molding step is added during the polyester formation or molding steps. As a result, a process is attained which achieves high yields, approaching 100%, with its associated reduced cost of production and less waste for disposal. No drying of preforms is necessary prior to recycling the scrap, which is ordinarily required in order to prevent hydrolytic degradation. Any hydrolytic degradation that occurs in feeding the polymer to the polymerization process has little effect since the polymer undergoes further polycondensation. The scrap need not spend significantly more time in the molten state at high molecular weight. This reduces polymer degradation, which improves color and reduces acetaldehyde formation. It is also not necessary to transport the scrap to a separate polyester manufacturing processes.

SUMMARY OF THE INVENTION

The invention provides a process for the continuous production of shaped molded polyester articles which comprises:

a) reacting polyester homopolymer or copolymer precursors in a reactor under conditions sufficient to produce a stream of molten polyester homopolymer or copolymer;

b) flowing the stream of molten polyester into at least one molding apparatus and forming solid molded articles and polyester scrap therefrom without solidifying the polyester prior to entry into the molding apparatus;

c) separating the polyester scrap from the solid molded articles; and d) recycling the polyester scrap to step (a) by adding it to the stream of molten polyester homopolymer or copolymer or their precursors.

DETAILED DESCRIPTION OF THE PREFERRED EMBODIMENT

Figure 1:
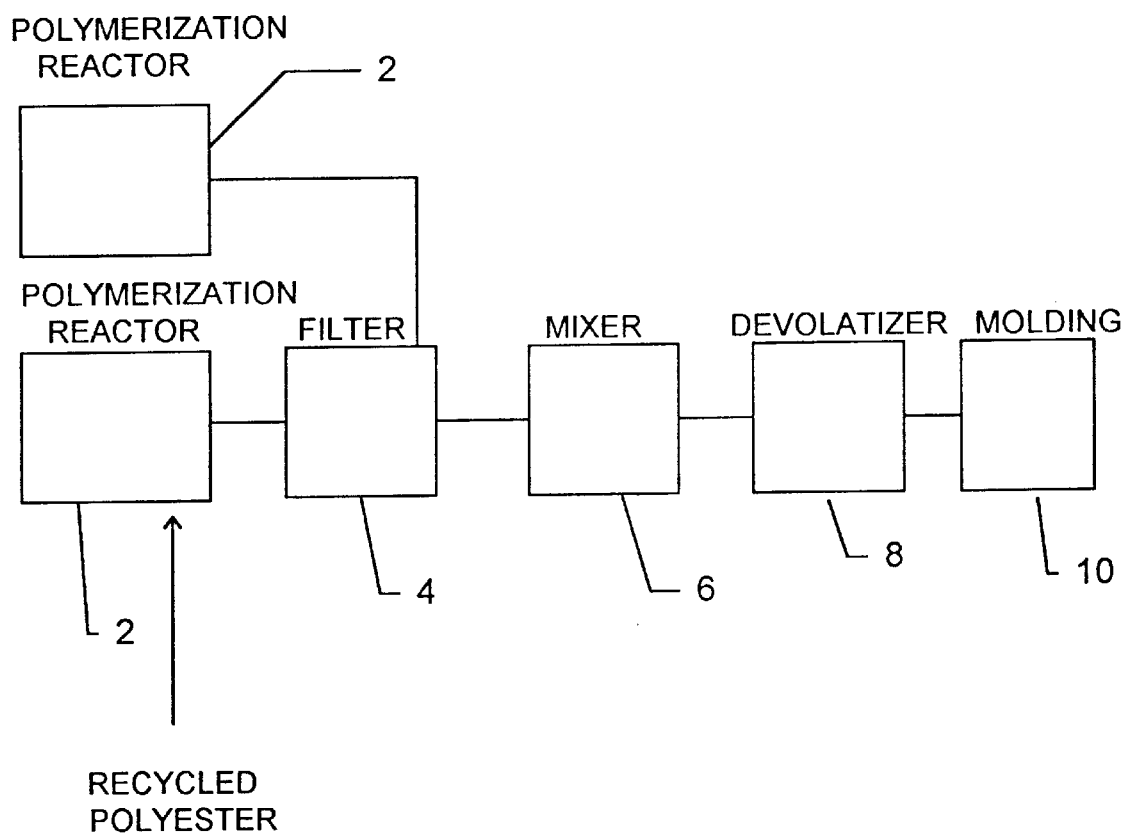
FIG. 1 shows a schematic view of the process sequence according to the invention.

The process of the invention involves the known initial steps of polyester formation by esterification of at least one dicarboxylic acid with at least one glycol, followed by polycondensation to form high molecular weight polyester; and subsequently forming the polyester into shaped articles. The polyester polymers are prepared from monomers in a melt-phase and fed directly to at least one molding or other shaping machine without solidifying the polyester prior to entry into the molding machine. Scrap polyester from the molding operation is then recycled back to the polymerization portion of the process.

Scrap polyester includes polyester trimmed from molded articles, articles rejected due to quality imperfections and recycled post consumer scrap not previously produced according to the above process steps a–c. The scrap can be added to any reactor in the melt phase processing steps including those in which esterification or transesterification of dicarboxylic acids or their dialkyl esters occurs or those in which polycondensation occurs. Alternately, the scrap could be added to process lines carrying oligomers or polymers between reactors and/or molding operations. The scrap can be added as a solid to a reactor or made molten by itself prior to feeding to a reactor. It may be desirable to grind the scrap to facilitate handling of the solid. The scrap can also be added by reacting it with a glycol, alcohol or water (depolymerization) to reduce its molecular weight prior to pumping into the reactor.

In the practice of the present invention, a polyester composition is prepared which may be produced by condensing a dibasic acid, such as a dicarboxylic acid or a lower alkyl diester thereof with a glycol. Among the dicarboxylic acids and their lower alkyl diesters which may be employed to form a molded polyester article are terephthalic; isophthalic; phthalic; naphthalene dicarboxylic; succinic; sebacic; adipic; azelaic; bibenzoic; the hexahydrophthalics, and bis-p-carboxy-phenoxyethane. Highly useful naphthalene dicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 2,8-isomers may also be used. Dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like. Preferred dibasic acids include terephthalic acid, isophthalic acid, naphthalene dicarboxylic acid, cyclohexane dicarboxylic acid and mixtures thereof. The dibasic acids may be used in acid form, acid anhydride form or as their esters such as the dimethyl esters. One or more of these acids and/or their lower alkyl diesters is reacted with one of more glycols which include glycols having from about 3 to about 10 carbon atoms and include ethylene glycol, propylene glycol, 1,3-propanediol, 1,4-butanediol, 1,6-hexanediol, diethylene glycol, 1,4-cyclohexanediol, 1,4-cyclohexanedimethanol, neopentyl glycol and the like. The 1,4-cyclohexanedimethanol may be in the cis or the trans form or as cis/trans mixtures. Preferred glycols include ethylene glycol, 1,4-cyclohexane dimethanol diethylene glycol and mixtures thereof. Since one or more diesters may be reacted with one or more glycols, the polyester film of this invention is not limited to homopolyesters but also includes mixed polyesters such as copolyesters as well as copolymers with other monomers.

Polymers that are particularly useful in this process include poly(ethylene terephthalate), poly(ethylene naphthalenedicarboxylate), and copolyesters containing up to about 50 mole % of modifying dibasic acids and/or glycols. Of the polyesters within the contemplation of this invention, preferred are those containing at least a major amount of polyethylene terephthalate, the most preferred are those containing at least 80 mol % terephthalic acid and 80 mol % ethylene glycol on a 200 mol % basis. Articles molded from polyethylene terephthalate are formed from a polymer produced by the polymerization of bis-(2-hydroxyethyl) terephthalate which is itself formed as an intermediate by one of two different methods. One method for producing bis-(2-hydroxyethyl) terephthalate is by direct esterification of terephthalic acid with ethylene glycol as described in U.S. Pat. No. 3,050,533. In this method the by-product of the reaction is water which is distilled from the reaction product. A second method for producing bis-(2-hydroxyethyl) terephthalate is by transesterification of dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of from about the boiling temperature of the reaction mixture to as high as 250° C. may be used. The reaction can occur at atmospheric, sub-atmospheric or super-atmospheric pressure. A by-product of the transesterification reaction is an alkanol. For example, if dimethyl terephthalate is used, methanol is produced. The alkanol is then removed from the reaction product.

In order to increase the reaction rate, many known catalysts may be employed in the transesterification reaction. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present from the beginning of the reaction, or may be added at any convenient point in the process.

After the intermediate bis-(2-hydroxyethyl) terephthalate has been produced, it may be converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer may have an intrinsic viscosity, as measured in orthochlorophenol at 25° C., in excess of 0.3 deciliter per gram. More preferably, the intrinsic viscosity of the polymer ranges from about 0.4 to about 1.0 deciliter per gram, measured in orthochlorophenol at 25° C. Still more preferably, the polyethylene terephthalate employed in the present invention has an intrinsic viscosity of about 0.5 to about 0.7 deciliter per gram as measured in orthochlorophenol at 25° C. Preferably the thermoplastic polyester containing polymers of this invention have a melting point prior to crystallization in the range of from about 200° C. to about 330° C. or more preferably from about 220° C. to about 290° C. and most preferably from about 250° C. to about 275° C.

Suitable for use as comonomers in polyester copolymers are such components as ethers, esters and partial esters of acrylic and methacrylic acid and of aromatic and aliphatic polyols. The production of such copolymers is well known in the art.

A feature of the present invention is the addition of scrap polyester produced in the continuous melt-to-mold process. That is, after the polyester is prepared as indicated above, scrap polyester is added into the melt and formed into useful shaped, molded articles in a single, integrated process without an intermediate solidification of the polyester.

Many different kinds of additives can also be added into the melt, depending on the nature of the desired properties in the finished article. Such additives may include, but are not limited to, colorants, anti-oxidants, acetaldehyde reducing agents, stabilizers, e.g. uv and heat stabilizers, impact modifiers, polymerization catalyst deactivators, melt-strength enhancers, antistatic agents, lubricants, chain extenders, nucleating agents, solvents, fillers, plasticizers and the like.

Suitable colorants include dyes and pigments. Useful colorants non-exclusively include dyes such as Victoria Pure Blue BO (Basic Blue 7, CI 42595) available as BASF Flexo Blue 636 from BASF Corp. of Parsippany, N.J., Rhodamine, Chalcozine, Victoria Blue and methyl violet and pigments such as the anthraquinone and phthalocyanine types. Perylene maroon, phthalocyanine blue, phthalocyanine green and cadmium red are similarly useful.

Acetaldehyde reducing agents include polyamides such as those disclosed in U.S. Pat. Nos. 5,266,413; 5,258,233 and 4,8837,115; polyesteramides; nylon-6 and other aliphatic polyamides such as those disclosed in Japan Patent Application Sho 62182065 (1987); ethylenediaminetetraacetic acid as disclosed in U.S. Pat. No. 4,357,461, alkoxylated polyols as disclosed in U.S. Pat. No. 5,250,333, bis(4-β-hydroxyethoxyphenyl)sulfone as disclosed in U.S. Pat. No. 4,330,661, zeolite compounds as disclosed in U.S. Pat. No. 5,104,965; 5-hydroxyisophthalic acid as disclosed in U.S. Pat. No. 4,093,593; poly(ethylene isophthalate) as disclosed in U.S. Pat. No. 4,403,090, supercritical carbon dioxide as disclosed in U.S. Pat. Nos. 5,049,647 and 4,764,323) and protonic acid catalysts as disclosed in U.S. Pat. Nos. 4,447,595 and 4,424,337.

A suitable impact modifier is ethylene methyl acrylate. Antistatic agents include stearamidopropyldimethyl-β-hydroxyethylammonium nitrate as disclosed in U.S. Pat. No. 4,302,505.

Solvents for the melt include alcohols such as methanol, ethanol, propanol butanol, benzyl alcohol and phenoxyethanol; ketones such as acetone, methyl ethyl ketone, methyl isobutyl ketone, cyclohexanone, diisobutyl ketone, etc., esters such as ethyl acetate, butyl acetate, amyl acetate, methyl formate, ethyl propionate, dimethyl phthalate, ethyl benzoate, methyl Cellosolve acetate, ethylene glycol monoethyl ether acetate and ethyl lactate; aromatic hydrocarbons such as toluene, xylene, benzene, ethylbenzene; halogenated hydrocarbons such as carbon tetrachloride, trichloroethylene, chloroform, 1,1,1-trichloroethane, 1,2-dichloroethane, monochlorobenzene, chloronaphthalene; ethers such as tetrahydrofuran, diethyl ethers, ethylene glycol monoethyl ether, ethylene glycol monomethyl ether, propylene glycol monomethyl ether, etc., dimethylformamide, dimethyl sulfoxide, N-vinyl pyrrolidone, etc., and mixtures thereof.

A particularly advantageous embodiment is the addition of a polymerization catalyst deactivator, preferably at the point that the polymer stream exits the polymerization reactor. Such deactivators may include compounds such as phosphate esters, tri-sodium phosphate, tri-potassium phosphate, alkyl or aromatic amines, amides, alkoxides, etc. In this embodiment, full catalytic activity is retained during the polymerization, thus minimizing the time needed for polymerization. Immediately after the desired molecular weight is reached, the polymerization catalyst is essentially deactivated. By this technique, further side reactions are drastically reduced throughout the rest of the process, and articles having exceptionally good color and thermal stability are produced.

Antioxidants include such compounds as phenols and particularly hindered phenols including Irganox 1010 from Ciba-Geigy; sulfides; organoboron compounds; organophosphorous compounds; N,N'-hexamethylenebis(3,5-di-tert-butyl-4-hydroxyhydrocinnamamide) available from Ciba-Geigy under the tradename "Irganox 1098". Stabilizers include hindered amines benzotriazole, hydroxybenzophenone, and the like. A suitable stabilizer is diglycidyl ether bisphenol A having a molecular weight of 2,000.

Fillers may be selected from a wide variety of minerals, metals, metal oxides, siliceous materials, metal salts, and mixtures thereof. Examples of fillers included in these categories are titanium dioxide, alumina, aluminum hydrates, feldspar, asbestos, talc, calcium carbonates, clay, carbon black, quartz, novaculite and other forms of silica, kaolinite, bentonite, garnet, mica, saponite, beidelite, calcium oxide, calcium hydroxide, etc.

Examples of suitable plasticizers include dioctyl phthalate, dibutyl phthalate, butyl phthalyl, butyl glycolate, tricresyl, phosphate, polyester series plasticizers and chlorinated paraffins.

Nucleating agents include alkali metal salts of carboxylic acids which may be prepared by reacting an organic carboxylic acid with a Group I metal base to form a Group I metal salt. Suitable carboxylic acid containing compounds include such aromatic acids as benzoic acid and substituted benzoic acid, aliphatic acids such as pivalic acid, fatty acids such as stearic acid, palmitic acid, and dimer acids. A preferred nucleating agent is sodium stearate. Other nucleating agent include metal salt ionomers such as an alkali metal salt ionomer. Ionomers useful for this invention include those disclosed in U.S. Pat. Nos. 4,381,376; 4,603,172 and 4,412,040.

The polyester modifiers listed above are typically blended with the polyester in an amount of from about 0.01 to about 15 weight percent based on the total weight of the modified polyester.

After reacting the polyester homopolymer or copolymer precursors in a reactor, molten polyester homopolymer or copolymer may be optionally filtered, mixed or otherwise agitated, devolatized and then flowed into at least one molding apparatus thus forming a solid molded article therefrom without solidifying the polyester prior to entry into the molding apparatus.

A filter is preferably used to homogenize the melt and remove impurities. Melt filters and mixers are well known in the art as exemplified by U.S. Pat. No. 5,564,827. Devolatilizing is done to remove gases and other volatile components in the melt. Such are typically done in a devolatilizing twin or multiscrew extruder with vacuum degassing as is well known in the art. Devolatilizing is exemplified by U.S. Pat. Nos. 5,376,702; 5,458,478 and 5,308,892.

For the purposes of this invention, molding includes any known manner of producing shaped solid articles from a melt. In a particularly useful embodiment of this invention, scrap polyester is added to a melt phase reactor feeding one or more molding machines. Optionally, a mixing section can be placed in the melt stream immediately following the addition point and prior to a molding machine. The compositions of the invention are useful for manufacturing shaped articles, such as structural parts by such processes as injection molding, gas-assist injection molding, blow molding, extrusion thermoforming and the like. Molding may be done in a commercially available molding machine such as 150 ton Cincinnati molder. The possible points of addition of the scrap polyester include in the melt phase reactor, i.e. during esterification or transesterification or a subsequent polycondensation; immediately after the polymerization is finished; immediately before a mixing element located in the melt distribution line; immediately before a distribution valve, and to lines feeding a molding machine. It will be appreciated that other addition points are also possible, and that more than one addition point may be used in any given process.

In the preferred embodiment, the amount of recycled polyester scrap which is blended with the virgin polyester produced in step (a) is an amount of from about 1 weight percent or less to about 60 weight percent based on the total weight of the polyester resulting from the overall process. More preferably the amount of recycled polyester scrap which is blended with the virgin polyester produced in step (a) is an amount of from about 1 weight percent or less to about 25 weight percent and most preferably from about 1 weight percent or less to about 10 weight percent based on the total weight of the polyester resulting from the overall process.

FIG. 1 shows a schematic view of one embodiment of the process sequence according to the invention. Polyester precursors are reacted in one or more reactors 2; flow through an optional filter 4, optional mixer 6, and optional devolatilizer 8 to suitable molding machines 10 in a continuous process without intermediate solidification or remelting of the polyester. It is understood that the polymerization reactor 2 can also comprises two or more reaction steps involving melt-phase preparation of a polyester by esterification or transesterification followed by polymerization. In such a case the addition can occur at either the preparation of a precursor polyester stage or crystallization and further polymerization stage or both, or between these two stages. Recycled polyester from the molding step is added at one or more points along the sequence of steps. Such may be conducted in the one or more polymerization reactors 2; after the polymerization reactor 2 but before filter 4; during filtering in filter 4; after filtering in filter 4 but before mixing in mixer 6; during mixing in mixer 6; after mixing in mixer 6 but before entering devolatilizers 8; during devolatilizing in devolatilizers 8; or after devolatilizing in devolatilizers 8 but before molding in molders 10. It is within the contemplation of the invention that recycled polyester may be added at different points as desired by the user. It will also be appreciated that a plurality of polymerization reactors, filters, mixers and devolatilizers may feed one or more molding machines either in series or parallel.

The following non-limiting examples serve to illustrate the invention. However it will be understood that they are provided merely for illustrative purposes, and are not intended to limit the scope of the invention in any way.

EXAMPLE 1

Filtered polyethylene terephthalate (PET) modified with 3.5 mol % 1,4-cyclohexanedimethanol (a 30/70 mol % cis, trans- mixture) is prepared in a melt-phase reactor to an IhV=0.64 and fed to a vented twin-screw reactor. After a residence time of 25 minutes at a temperature of 275° C. and a pressure of 0.75 torr, the polymer has an IhV=0.75 and residual acetaldehyde of 5 ppm. As used herein, the term "IhV" refers to inherent viscosity of the polymer as determined by a solution of 0.5 gram of polymer dissolved in 100 ml of a mixture of phenol (60% by volume) and tetrachloroethane (40% by volume). The polymer is then pumped to molding machines through a system of distribution pipes and valves at a mean residence time of approximately 7 minutes. The molding machines each have a residence time before the polymer has been cooled below 200° C. of approximately 40 seconds. The amount of residual acetaldehyde in the molded 0.75 IhV preforms is 15 ppm. The molding machines produce molded bottles together with polyester scrap. Some of the scrap is bottles rejected because of quality concerns.

The acceptable bottles are separated from the scrap, and the scrap returned as a feed to the melt phase reactor.

EXAMPLE 2

The process of Example 1 is repeated, but an injection port is added to the process stream immediately following the final twin-screw reactor. A static mixing element is placed in the line following the addition port. The bottles are produced, separated from the scrap and the scrap is returned as a feed to the melt phase reactor. A rotary air lock or single screw extruder is used to additionally meter recycled, melted scrap polyester, with or without polymerization, through the addition port.

EXAMPLE 3

PET is prepared in a melt-phase reactor to an IhV=0.74 with a final melt temperature of 285° C., filtered, and then the flow is split and distributed to ten devolatilizing vented extruders and flowed to ten molding machines. Each stream has a flow rate equal to the capacity of one multi-cavity bottle molding machine. The bottles are produced, separated from scrap polyester, including bottles rejected for poor quality, and the scrap is returned as a feed to the melt phase reactor. Recycled polyester scrap is also added to the streams of molten PET at a point prior to the molding machines.

EXAMPLE 4

PET is prepared to an IhV=0.75 at 270° C. in a melt-phase reactor. The output of the reactor is divided into ten streams, feeding ten devolatilizing stations and ten multi-cavity bottle molding machines. The bottles are produced, separated from scrap polyester and the scrap is returned as a feed to the melt phase reactor. Scrap recycled polyester produced from the molding machines is also added at the end of the devolatilizers, and the polymer is ejected through a static mixing section. There is no significant difference color or acetaldehyde content among the bottles.

What is claimed is:

1. A process for the continuous production of shaped molded polyester articles which comprises:
   a) reacting dibasic acid and glycol precursors of polyester homopolymer or copolymer in a reactor under
      i) esterification or transesterification conditions, followed by
      ii) polycondensation conditions,
      thereby producing a stream of molten polyester homopolymer or copolymer;
   b) flowing the stream of molten polyester into at least one molding apparatus and forming solid molded articles and polyester scrap therefrom without solidifying the polyester prior to entry into the molding apparatus;
   c) separating the polyester scrap from the solid molded articles; and
   d) recycling the polyester scrap to step (a) by adding it to the stream of molten polyester homopolymer or copolymer or their precursors.

2. The process of claim 1 wherein recycling is additionally conducted during step (b).

3. The process of claim 1 wherein recycling is conducted additionally between steps (a) and (b).

4. The process of claim 1 wherein recycling is conducted during step i) esterification or transesterification of step (a).

5. The process of claim 1 wherein recycling is conducted during step ii) polycondensation of step (a).

6. The process of claim 1 wherein recycling is conducted during both steps i) and ii) of step (a).

7. The process of claim 1 wherein recycling is conducted between steps i) and ii) of step (a).

8. The process according to claim 1 wherein step (a) further comprises one or more steps of filtering, mixing and devolatilizing the stream of molten polyester homopolymer or copolymer prior to flowing the stream of molten polyester into the molding apparatus; and recycling is conducted before, during and/or after the filtering, mixing and/or devolatilizing.

9. The process according to claim 1 wherein step (b) is conducted with a plurality of molding apparatuses.

10. The process according to claim 1 wherein the polyester is a homopolymer.

11. The process according to claim 1 wherein the polyester is a polyester containing copolymer.

12. The process according to claim 1 wherein the polyester is a polyethylene terephthalate homopolymer.

13. The process according to claim 1 wherein the polyester homopolymer or copolymer resulting from step (a) has an intrinsic viscosity which ranges from about 0.4 to about 1.0 deciliter per gram, again measured in orthochlorophenol at 25° C.

14. The process according to claim 1 wherein the polyester further comprises one or more components selected from the group consisting of colorants, antioxidants, acetaldehyde reducing agents, stabilizers, impact modifiers, polymerization catalyst deactivators, antistatic agents, lubricants, nucleating agents, solvents, fillers, plasticizers and melt-strength enhancers.

15. The process according to claim 1 wherein the recycled polyester scrap is blended with the polyester produced in step (a) in an amount of from about 1 to about 60 weight percent based on the total weight of the polyester resulting from the process.

16. The process according to claim 1 wherein the recycled polyester scrap is blended with the polyester produced in step (a) in an amount of from about 1 to about 25 weight percent based on the total weight of the polyester resulting from the process.

17. The process according to claim 1 wherein the recycled polyester scrap is blended with the polyester produced in step (a) in an amount of from about 1 to about 10 weight percent based on the total weight of the polyester resulting from the process.

18. The process of claim 1 further comprising the step of recycling additional polyester to step (a), which additional polyester was not previously produced by steps a–c.

19. The process of claim 1 comprising reacting polyester homopolymer or copolymer precursors in a plurality of reactors, under conditions sufficient to produce a plurality of streams of essentially the same molten polyester homopolymer or copolymer, and flowing the plurality of streams of molten polyester to at least one molding apparatus.

* * * * *